(No Model.) 2 Sheets—Sheet 1.
E. SWARTZ & D. S. BEEMER.
AUTOMATIC VEHICLE BRAKE.
No. 501,545. Patented July 18, 1893.
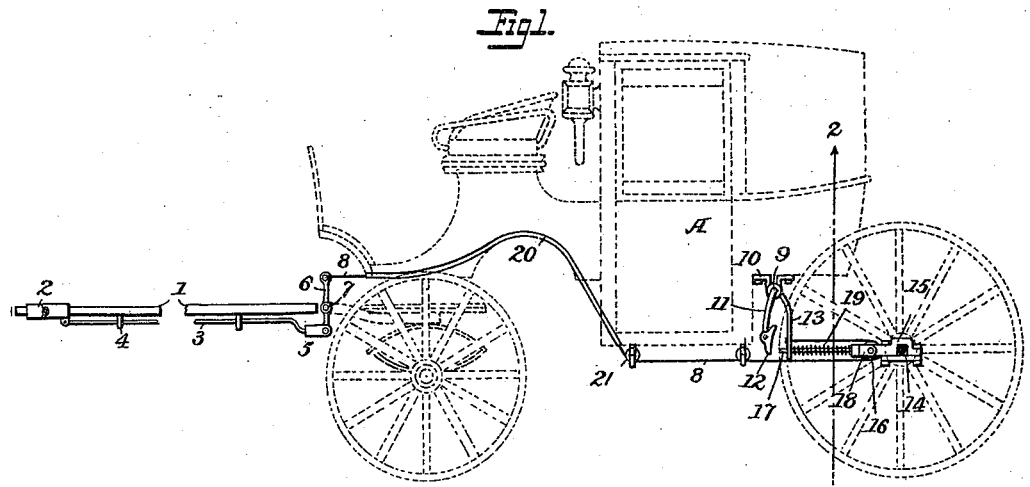
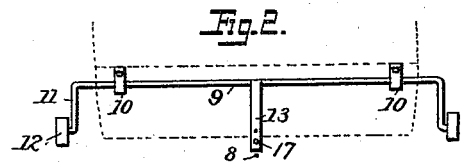
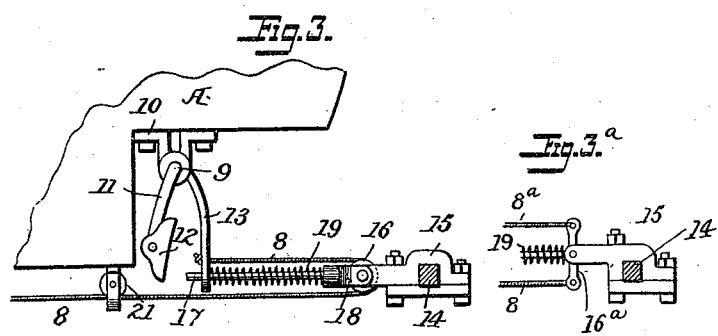
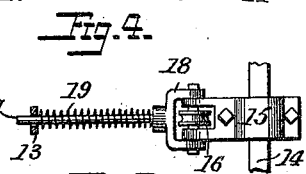
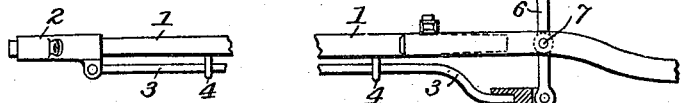
Witnesses
Jno G. Hinkel
Wm. E. Neff
Inventors
Eli Swartz & D. S. Beemer
by J. A. Watson
Attorney (No Model.) 2 Sheets—Sheet 2.

E. SWARTZ & D. S. BEEMER.
AUTOMATIC VEHICLE BRAKE.

No. 501,545. Patented July 18, 1893.

Witnesses
Jno. G. Hinkel
Wm. E. Neff

Inventors
Eli Swartz & D. S. Beemer
by J. H. Watson
Attorney

UNITED STATES PATENT OFFICE.

ELI SWARTZ AND DANIEL S. BEEMER, OF SCRANTON, PENNSYLVANIA.

AUTOMATIC VEHICLE-BRAKE.

SPECIFICATION forming part of Letters Patent No. 501,545, dated July 18, 1893.

Application filed July 25, 1892. Serial No. 441,170. (No model.)

*To all whom it may concern:*

Be it known that we, ELI SWARTZ and DANIEL S. BEEMER, citizens of the United States, residing at Scranton, in the county of Lackawanna and State of Pennsylvania, have invented certain new and useful Improvements in Automatic Vehicle-Brakes, of which the following is a specification.

Our invention relates to automatic carriage brakes and it consists in various improvements in brake devices for carriages and wagons, especially suitable for cut-under vehicles.

Figure 7:
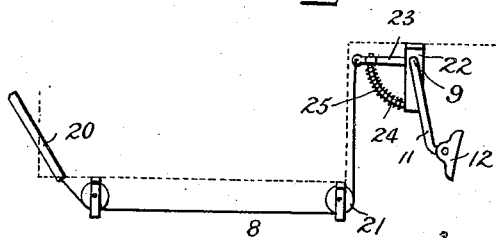
Figure 8:
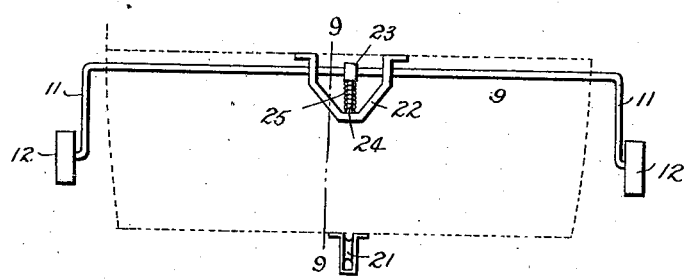
Figure 9:
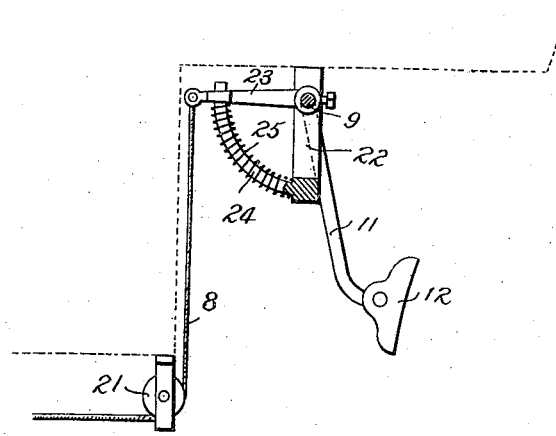

In the accompanying drawings, in which like reference signs refer to similar parts throughout the several views, Figure 1 is a side elevation of a carriage with the preferred form of our improved brake applied thereto. Fig. 2 is a rear elevation of a portion of the carriage, the brake mechanism being shown in section on the line 2—2 of Fig. 1. Figs. 3 and 4 are side and plan views respectively of a portion of the brake mechanism. Fig. 3ª is a view of a modified form. Figs. 5 and 6 are respectively a side view partly in section and a bottom plan view of the carriage tongue and brake connections. Figs. 7 and 8 are side and rear views respectively of a modified form of brake rigging, and Fig. 9 is a sectional view on the line 9—9 of Fig. 8.

Our improvements relate to the class of automatic wagon brakes in which the pressure of the carriage or wagon upon the horses in going down hill, or in other words the backward pressure of the horses, is used to apply the brakes. By this arrangement the brakes are always applied at the proper times and with a power proportionate with the grade of the hill.

Referring to Figs. 1 to 6 inclusive, A indicates the body of the wagon or carriage to which the brake mechanism is applied. Upon the outer end of the pole 1 is a sleeve 2 which is connected to the harness of the horses in any suitable way so as to be drawn backward toward the carriage when the latter is going down a grade. From the sleeve 2 a rod 3 extends through guides 4 to the opposite or inner end of the pole. The inner end of the rod 3 is dropped down several inches and fits within a socket piece 5 which is pivoted to the lower end of a lever 6. The lever 6 is pivoted at or near its center upon a rod or bolt 7 passing through the hounds of the carriage and to its upper end is connected a flexible rod or cord 8 which extends rearwardly to the brake mechanism. The pole 1 is removable from the carriage in the usual manner and the rod 3 is capable of removal with it, the connection of the rod 3 with the socket piece 5 being a simple telescopic joint without any permanent fastening. When the pole is connected to the carriage the socket piece 5 is continuously pressed against the rod 3 by a spring, which will be hereinafter described, acting through the rope 8 upon the upper end of the lever 6.

Under the rear end of the body A the brake shaft 9 is carried in brackets or bearings 10 which are fastened to the body. At the ends of the brake shaft are arms 11 carrying brake shoes or blocks 12 adapted to bear upon the wheels, and at or near the middle of the brake shaft is a downwardly extending lever arm 13 adapted to be drawn backward to apply the brakes.

Upon the rear axle 14 is fastened a clip or bracket 15 upon the inner end of which is mounted a pulley 16. A rod 17 is also pivotally connected to the bracket, preferably as shown by a yoke piece 18 which straddles the bracket and is pivoted upon the outer ends of the pin or bolt passing through the pulley. The free end of the rod 17 passes through a perforation in the lower end of the lever arm 13 and between the rod 13 and the yoke 18 a spiral spring 19 surrounding the rod is confined. The rope 8 extends rearwardly from the lever 6 passing first through a curved tube 20 which extends through the forward part of the carriage body, then under pulleys 21 upon the body, around the pulleys 16 on the rear axle, and back to the lever arm 13 to which it is connected.

The operation is as follows: When the carriage is traveling on a level surface or up hill the spring 19 forces the lever arm 13 forward, thus drawing the rope 8 rearwardly under the bottom of the wagon or carriage and forcing the rod 3 and sleeve 2 forward. When the carriage is going down hill the sleeve 2 is drawn rearwardly upon the pole and the rod 3 operating through the lever 6 and rope 8 draws the lever arm 13 rearwardly and applies the brakes, the effect of the brakes upon the wheels being proportioned to the grade of the hill. On account of the vertical movement of the carriage upon its springs the body moves relatively to the axle and to accommodate this movement the rod 19 is pivotally connected to the axle.

In Figs. 7, 8 and 9 a modified form of our invention is shown. In these figures the brake shaft 9 is mounted in a bracket 22 and the lever arm 23 of the brake shaft extends forward instead of downward, the rope 8 being connected directly to the end of the lever arm. In order to throw off the brakes a rod 24 upon the bracket 22 extends upward through a perforation in the lever arm 23. A spiral spring 25 surrounding the rod 24 operates to throw off the brakes and to throw the sleeve 2 forward in the same manner in which the spring 19 operates in the construction first described.

Instead of the pulley 16 shown in Figs. 3 and 4 a lever 16ª may be used as illustrated in Fig. 3ª. The rope 8 is attached to the lower end of the lever, and the upper end of the lever may be connected to the brake lever by a rope or rod 8ª. The lever 6 may in some instances be located in the rear of the fifth wheel, instead of in front, as shown.

What we claim, and desire to secure by Letters Patent, is—

1. In a vehicle brake the combination with the lever mounted in the hounds, the pole having a sliding collar at its outer end, and the rod connecting the collar with the lever, of the brake shaft mounted in bearings upon the body and having brake arms and blocks at each end, a brake lever connected to the brake shaft, a pulley connected to the rear axle, and a rope connected to the brake lever and extending around said pulley and forward to the lever mounted in the hounds of the vehicle, substantially as described.

2. In a vehicle brake the combination of a shaft mounted in bearings upon the body and having brake arms and blocks at each end, the brake lever 13 extending downward from the shaft and having a perforation in its lower end, the rod 17 pivotally connected to the rear axle and passing through said perforation in the brake lever, the spring 19 upon the rod, the pulley connected to the rear axle, and the rope connected to the brake lever and extending around the pulley and forward to the front of the vehicle, substantially as described.

3. In a vehicle brake the combination of the shaft mounted in bearings upon the body and having brake arms and blocks at each end, the brake lever extending downward from the shaft and having a perforation near its lower end, the clip connected to the rear axle, the pulley mounted in the clip, the yoke 18 embracing the clip and pivotally connected thereto, the rod 17 extending through the perforation in the brake lever, the springs 19 surrounding said rod and interposed between the brake lever and the yoke, and the rope connected to the brake lever and extending around the pulley and forward to the front of the vehicle, substantially as described.

4. In an automatic vehicle brake the combination of a removable pole, a lever mounted in the hounds of the vehicle and having a socket piece 5 at its lower end, a sleeve upon the outer end of the pole, and a rod connected to the sleeve at one end and having its other end removably fitted within said socket piece, whereby the pole and the rod may be readily removed together from the vehicle substantially as described.

5. In an automatic brake for cut-under vehicles the combination of the sleeve 2 and the rod 3 mounted upon the pole, the lever 6 mounted in the hounds and connected at its lower end with the rod 3, the rope 8, the pipe 20 guiding the rope 8 through the forward part of the vehicle, guide pulleys 21 beneath the vehicle, the pulley connected with the rear axle around which the rope 8 passes, and brake mechanism to which said rope is connected, substantially as described.

In testimony whereof we affix our signatures in presence of two witnesses.

ELI SWARTZ.
DANIEL S. BEEMER.

Witnesses:
JAS. H. TORREY,
H. J. ERNST.